(12) United States Patent
Harris

(10) Patent No.: US 7,874,302 B2
(45) Date of Patent: Jan. 25, 2011

(54) SPRAY CLEANING APPARATUS FOR CAUL SCREENS

(76) Inventor: Troy Douglas Harris, 1154 Front Road North, Amherstburg, Ontario (CA) N9V 3R3

( * ) Notice: Subject to any disclaimer, the term of this patent is extended or adjusted under 35 U.S.C. 154(b) by 390 days.

(21) Appl. No.: 11/905,537

(22) Filed: Oct. 2, 2007

(65) Prior Publication Data

US 2009/0083931 A1    Apr. 2, 2009

(51) Int. Cl.
*B08B 3/02* (2006.01)
(52) U.S. Cl. .................................... 134/198
(58) Field of Classification Search ............... 134/198
See application file for complete search history.

(56) References Cited

U.S. PATENT DOCUMENTS 5,135,580 A * 8/1992 Cantrell et al. ........... 134/22.11
5,179,769 A * 1/1993 Ferguson et al. ............... 28/292
5,783,044 A * 7/1998 Schneider et al. ........... 162/278
6,305,261 B1 * 10/2001 Romanini ....................... 83/53

* cited by examiner

*Primary Examiner*—Michael Cleveland
*Assistant Examiner*—Samuel A Waldbaum

(57) ABSTRACT

A spray cleaning apparatus for cleaning the surface of a caul screen includes at least one cleaning head assembly having a cleaning head in fluid communication with a pressurized fluid source. The cleaning head has an upstream end and at least one outlet nozzle in fluid communication with the upstream end, and which are operable to direct a generally linear high pressure fluid stream onto the surface of the caul screen. The cleaning head assembly is moveably mounted on a support beam so as to be maintained a substantially fixed distance from the caul sheet. A conveyor reciprocally moves part of the sheet beneath the cleaning head assembly, with the cleaning head being indexed in movement along the support to successively reposition cleaning fluid flow relative to the sheet.

18 Claims, 4 Drawing Sheets

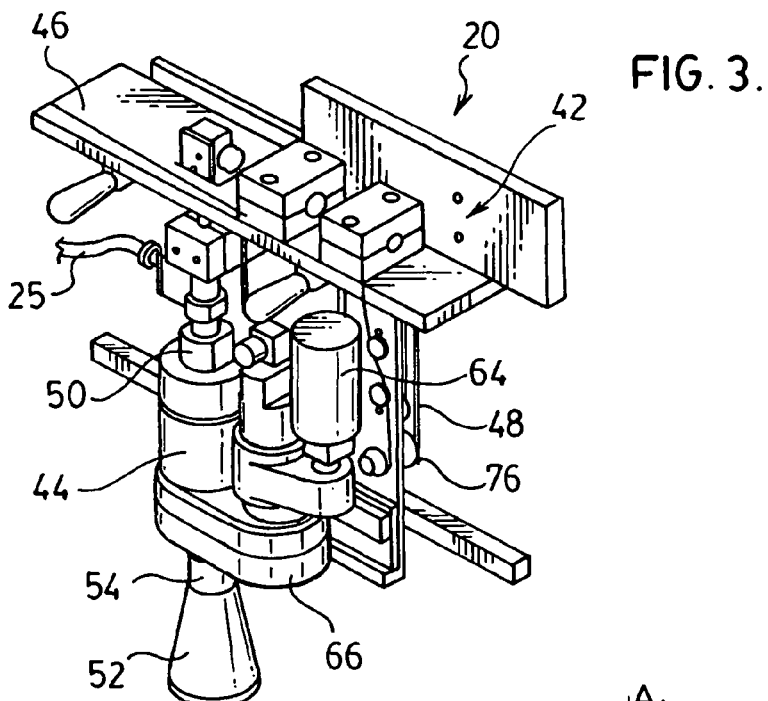
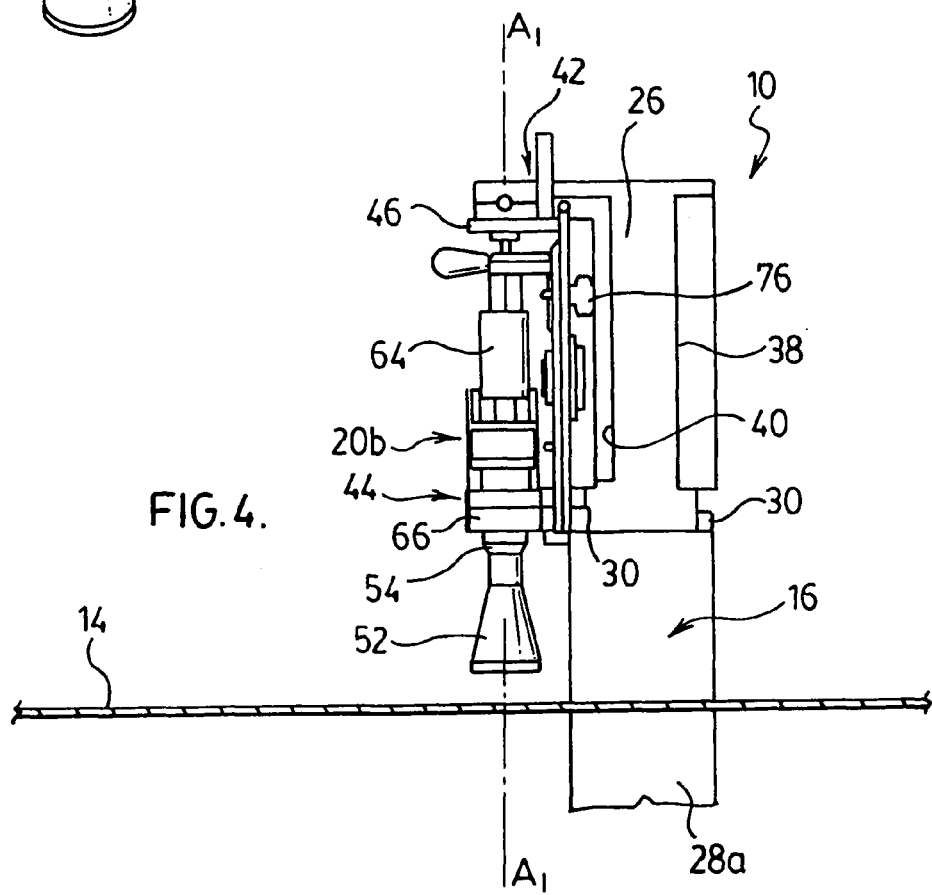

SPRAY CLEANING APPARATUS FOR CAUL SCREENS

SCOPE OF THE INVENTION

The present invention relates to an apparatus for cleaning screens and other porous sheets, and more preferably a spray cleaning apparatus used to dislodge cellulose fibers, waxes, resins and other debris from wire mesh or caul screens used in fiberboard and oriented strand board manufacturing applications.

BACKGROUND OF THE ART

The use of caul screens in fibreboard, particleboard and oriented strand board (hereinafter collectively referred to as "(OSB)" manufacturing is well known. Caul screens are semi-rigid or flexible woven metal mesh screens having a pore size of 0.1 to 0.3 mm. The screens are used as a backing layer to convey heat activated resins together with wood fibers and other cellulose strands into a hot press. The press is then operable to compress and fuse the fibrous materials with the resins into a fiberboard/oriented strand board panel. Following formation, the panel is separated from the screen and trimmed. Any screens which thereafter remain undamaged are then cleaned for further use.

In conventional OSB panel manufacturing systems, the cleaning of caul screens is typically performed manually, by washing the screens using hand-held pressure washers to dislodge any debris which has accumulated thereon. Conventional manufacturing systems suffer the disadvantage in that the manual pressure washing of screens is both labour intensive and inefficient. Hand-held pressure washers typically operate to produce a discharge spray from a single outlet nozzle which is formed with an aperture diameter of 1 to 2 mm. As a result, the pressure of the cleaning fluid stream as it leaves the nozzle is comparably low, often providing an output stream of water at pressures as low as of 250 psi or less. The lower water pressures are often insufficient to effect penetrating of the cleaning fluid through smaller sized mesh apertures. This problem is particularly acute where water alone is used as a cleaning fluid, and without the benefit of surface tension reducing surfactant additives. As a result, while manual pressure washing may achieve partial cleaning of the face surfaces of a caul screen, it is frequently ineffective in dislodging resins and/or other debris from within the mesh openings themselves.

In addition, the applicant has appreciated that the manual pressure washing of caul screens requires comparatively higher volumes of cleaning fluids. In the case of water, these volumes may exceed a flow rate of five gallons per minute. The discharge of excess water may disadvantageously result in conveyor belt or pulley slippage, or other unintentional wetting and/or lubrication of system components.

SUMMARY OF THE INVENTION

Accordingly, it is an object of the invention to provide an automated system for cleaning the surface of porous sheets, such as mesh or caul screens. The system is operable to apply one or more of pressurized cleaning fluid streams thereon at a comparably higher pressure, and more preferably at pressures greater than 30,000 psi, so as to ensure the penetration of screen opening having a pore size of less than about 0.5 mm, and preferably less than about 0.25 mm by the cleaning fluid.

Another object of the invention is to provide an apparatus for cleaning the surface of a semi-rigid or flexible porous sheet, and which includes a cleaning head assembly adapted for movement on a support member or beam, so as to permit a repositioning of a cleaning fluid outlet nozzle over different sections of the sheet to be cleaned.

Yet another object of the invention is to provide a spray-cleaning apparatus for use in cleaning a caul screen, and which includes multiple cleaning heads which are repositionable in indexed movement relative to the sheet.

Another object of the invention is to provide a caul screen cleaning apparatus which includes one or more cleaning heads which are operable to emit a fluid flow stream for removing resins and other debris therefrom at a comparably lower flow rate selected at less than about 3 gallons per minute, and preferably less than about 1 gallon per minute.

To at least partially overcome some of the disadvantages associated with the prior art, the present invention provides for a spray cleaning apparatus for cleaning the surface of porous sheets, and preferably semi-rigid or flexible mesh screens or caul screens. The apparatus includes at least one cleaning head assembly having a cleaning head, and which is in fluid communication with a pressurized fluid source operable to supply a suitable cleaning fluid thereto under pressure.

In a simplified construction, the cleaning head has an upstream end and at least one, and most preferably at least three, outlet nozzles in fluid communication with the upstream end. The outlet nozzles of the cleaning head each being operable to direct a cleaning fluid flow therefrom. Most preferably, the cleaning fluid flow is generally linear, high pressure fluid stream which is directed onto the surface of the sheet to be cleaned. Although not essential, in a preferred construction, the cleaning head assembly is mounted on a support beam, arm or gantry, such that the cleaning head is maintained a substantially fixed distance away from the sheet while being movable over at least part thereof. A conveyor may further be provided to reciprocally move at least part of the sheet beneath the cleaning head assembly in one or more cleaning passes, with the cleaning head being indexed in movement to successively reposition the path of cleaning fluid flow relative to the sheet after each pass.

Optionally, the cleaning head may be mounted for rotational movement about an axis generally normal to the portion of the sheet surface to be cleaned. A drive motor is provided to rotate the cleaning head while the cleaning fluid flow is directed therefrom onto the surface of the sheet or screen. In a preferred mode of operation, the drive motor is operable to rotate the cleaning head about the axis at a preferred rate of about 2,000 to 4,000 rpm, and most preferably at about 3,000 rpm.

In a most preferred mode of operation, the cleaning fluid is surfactant-free water, and most preferably municipal tap water. It is to be appreciated however, that depending on the sheet to be cleaned and/or the nature of the contaminants or debris to be removed, other cleaning fluid compositions, either with or without surfactant additives and/or water may also be used.

Accordingly, in one aspect the present invention resides in an apparatus for cleaning debris from the surface of a porous sheet, the apparatus comprising at least one cleaning head assembly having a cleaning head, and a pressurized fluid source for supplying cleaning fluid under pressure to said cleaning head, the cleaning head having an upstream end fluidically coupled to said pressurized fluid source and a plurality of outlet nozzles in fluid communication with the upstream end, the outlet nozzles each being operable to direct a cleaning fluid flow in an axial direction onto a surface of said sheet, a head drive operable to selectively rotate said cleaning head about the axis, a support member for supporting said outlet nozzle in an operable position spaced from said sheet, and a conveyor for reciprocally moving at least one of said sheet and said support member relative to each other.

In another aspect, the present invention resides in a caul screen cleaning apparatus for removing wood fibers and waxes from the surface of a caul screen, the caul screen comprising a generally planar mesh sheet having mesh openings with an average size selected at between about 0.1 and 0.6 mm, the apparatus comprising a pressurized fluid source, a sprayer assembly in fluid communication with the fluid source, the sprayer assembly including a cleaning head assembly having a cleaning head operable to emit a cleaning spray in a first direction generally perpendicular to the planar mesh sheet, support assembly for supporting said spray assembly comprising at least one generally horizontally extending elongate member, the sprayer assembly being slidably mounted on said elongate member, an assembly drive activatable to selectively position said sprayer assembly relative to said elongate member, a conveyor for reciprocally conveying at least part of said mesh sheet in a conveyance direction generally normal to a direction of elongation of said elongate member, said conveyor maintaining said caul screen in an orientation permitting substantially unhindered movement of said support assembly along said elongate member during cleaning operation, the assembly drive being activatable to advance said sprayer assembly in a transverse direction normal to said conveyance direction to move said cleaning head across said mesh sheet, wherein during operation of the sprayer assembly to emit said cleaning spray, said conveyor is operable to move said caul screen in said first direction to move at least part of said mesh sheet beneath said cleaning spray.

In yet a further aspect, the present invention resides in a spray cleaning apparatus for cleaning debris from the surface of a screen, the apparatus comprising a cleaning fluid source and at lest one cleaning assembly having a cleaning head fluidically coupled to the cleaning fluid source, a support member for movably supporting and maintaining said at least one cleaning assembly a predetermined operable distance spaced from said sheet, the cleaning head having a plurality of outlet nozzles each operable to emit a respective cleaning fluid stream therefrom onto a surface of said sheet, and a conveyor for selectively moving said screen relative to said support while said cleaning fluid streams are emitted from said nozzles.

BRIEF DESCRIPTION OF THE DRAWINGS

Reference may now be had to the following detailed description taken together in conjunction with the accompanying drawings in which:

FIG. 3 illustrates an enlarged perspective view of a cleaning head assembly used in the apparatus of FIG. 1;

FIG. 4 illustrates a large cross-section view of the apparatus of FIG. 1 taken along line 4-4.

DETAILED DESCRIPTION OF THE PREFERRED EMBODIMENTS

Figure 1:
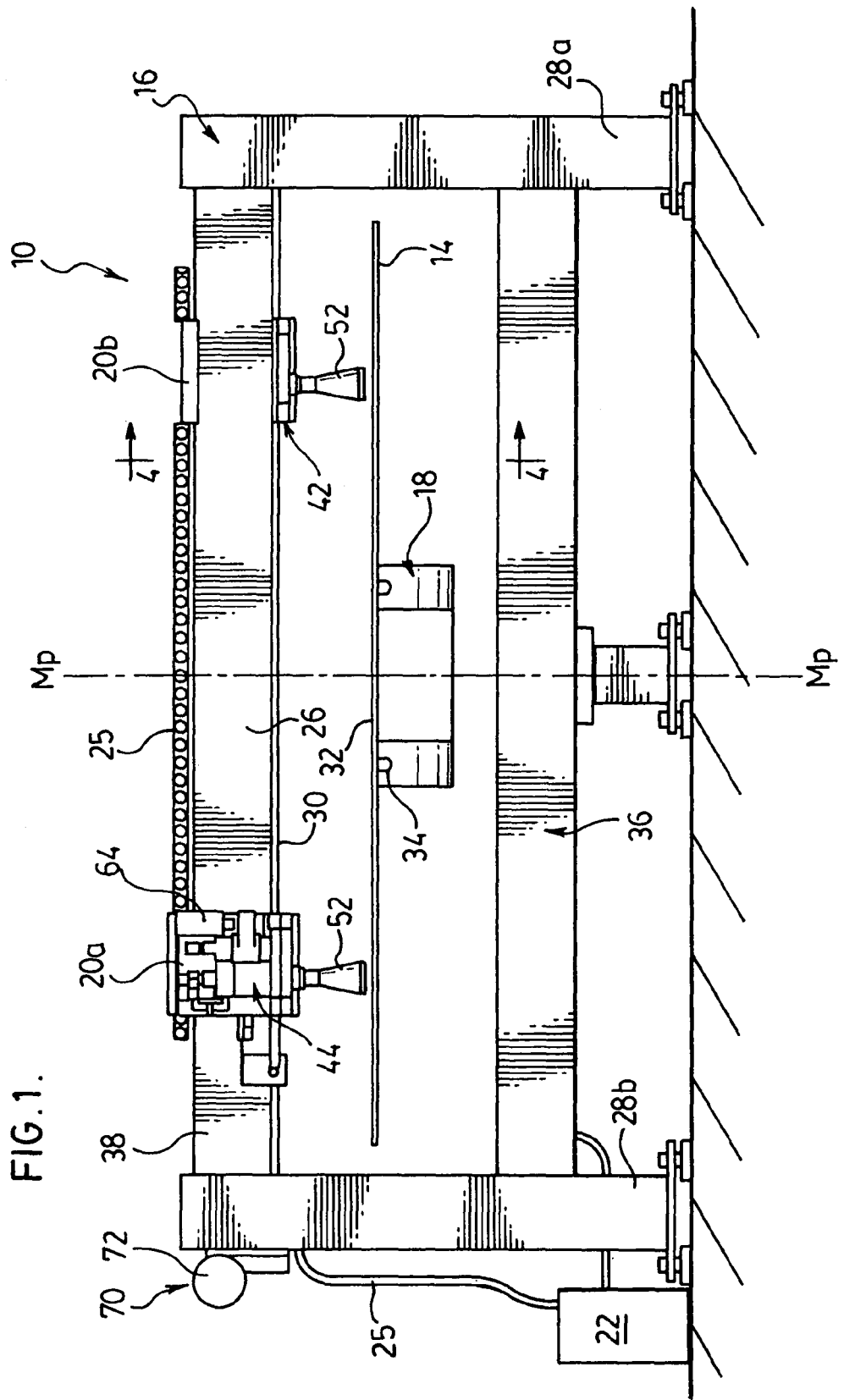
FIG. 1 illustrates a schematic side view of a spray cleaning apparatus for use in cleaning caul screens in accordance with a preferred embodiment of the invention.
Figure 2:
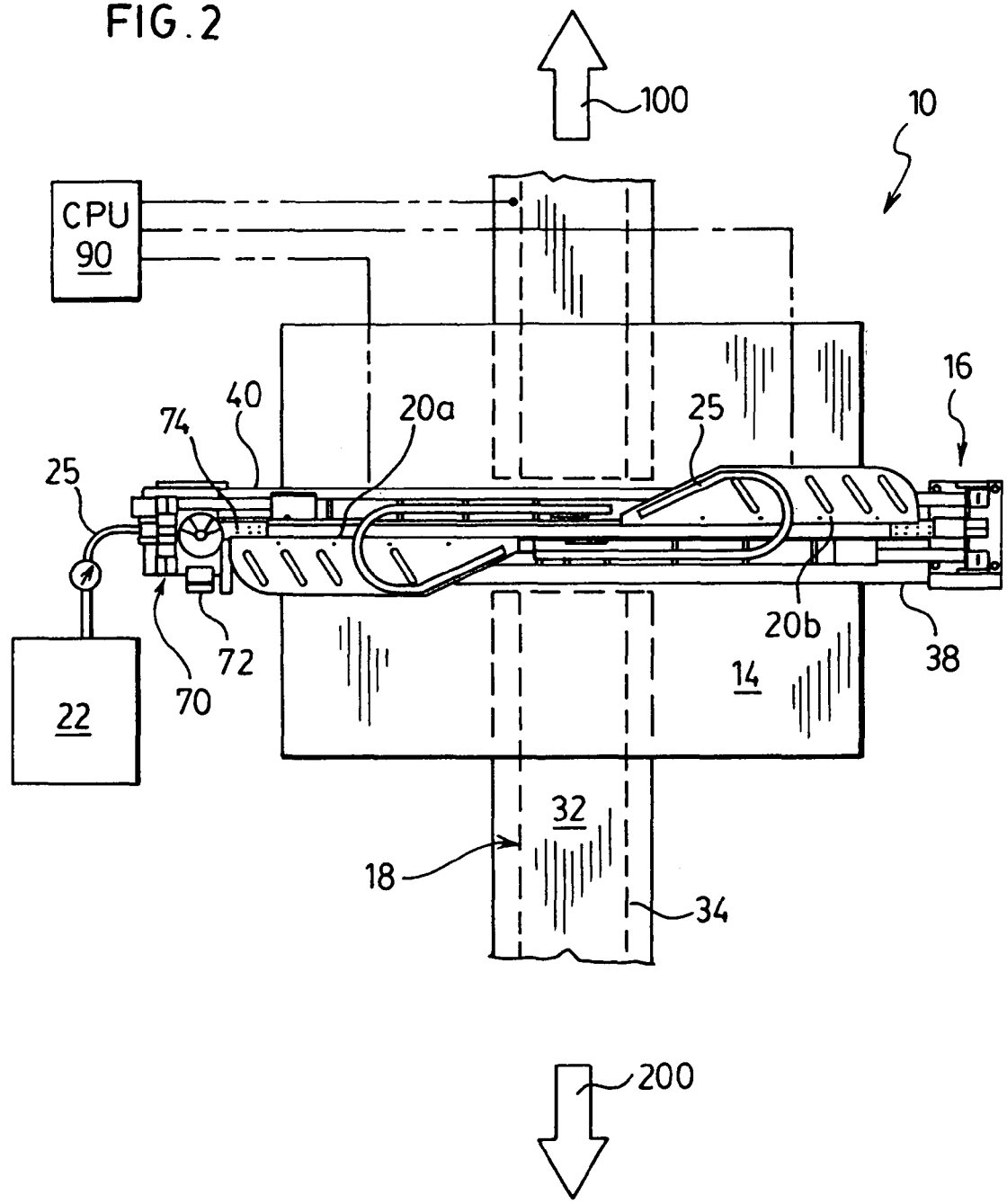
FIG. 2 illustrates a schematic top view of the apparatus of FIG. 1.

Reference may be had to FIGS. 1 and 2 which illustrate a spray cleaning apparatus 10 used to clean wood fibers, waxes, leaves and other such debris from a metal screens 14, and preferably caul screens, in accordance with a preferred embodiment of the invention. As will be described, the screen 14 is of a conventional woven mesh construction having a preferred opening size of about 0.2 mm, and is of a type commonly used in conventional OSB panel manufacturing operations. The screen 14 may be provided as either a continuous loop, or more preferably as a flexible sheet or panel having generally flat upper and lower planar surfaces, and with a discrete length selected at between about 2.5 and 6 meters.

The apparatus 10 includes a support frame 16, a conveyor assembly 18, two cleaning head assemblies 20a,20b, and a high pressure water pump 22. As will be described, the water pump 22 is provided in fluid communication with each cleaning head assembly 20a,20b by way of a flexible hosing 25, to supply substantially surfactant-free water as a cleaning fluid to each of the cleaning head assemblies 20a,20b during cleaning operations.

The support frame 16 is illustrated best in FIG. 1 as including an overhead gantry or support beam 26 which is elongated in a longitudinal direction, and to which each of the cleaning head assemblies 20a,20b are mounted. The beam 26 has a preferred length of between about 2.5 and 3 meters, and which is selected greater than the maximum width of the screen 14 to be cleaned. The support beam 26 is secured in a suspended horizontal orientation at each of its ends by a pair of vertical steel support posts 28a,28b. A guide rail 30 is provided along each side of the beam 26 and as will be described, assists in guiding the cleaning head assemblies 20a,20b in movement therealong.

The conveyor assembly 18 is shown best in FIG. 2 as being operable to reciprocally move the screen 14 into and from the apparatus 10 in both an initial forward feed direction of arrow 100 which is traverse to the longitudinal direction of the beam 26; as well as in reverse direction of arrow 200, opposite to the path of infeed movement. FIG. 1 shows the conveyor assembly 18 as being spaced a distance vertically beneath the beam 26. The conveyor assembly 18 most preferably is a reversible chain-type conveyor which includes a horizontally extending conveyor surface 32 and a series of chain lugs 34. The chain lugs 34 are adapted to selectively engage the screen 14 for conveyancing along the horizontal surface 32. Optionally, a fluid collecting pan 36 (FIG. 1) is provided vertically spaced beneath the support beam 26 and conveyor assembly 18. In operation of the cleaning apparatus 10 the collection pan 36 may be used to collect excess cleaning fluid and/or effluent for filtration and recirculation to the water pump 22.

The cleaning head assemblies 20a,20b are respectively mounted for sliding movement horizontally respectively along the side 38 outfeed side 40 of the support beam 26. Each of the cleaning head assemblies 20a,20b have the identical construction identified generally by reference numeral 20 in FIG. 3. The cleaning head assembly 20 includes a slide mount 42 for slidably coupling the cleaning assembly 20 to a respective side 38,40 of the support beam 26, and a sprayer assembly 44 which is coupled to the slide mount 42 for movement therewith. The slide mount 42 includes a top guide plate 46 and a guide block 48 which slidably mate with the support guide rails 30 which extend longitudinally along the support beam 26. The guide plate 46 and guide block 48 are thus used to maintain the sprayer assembly 44 in a desired spacing and fixed alignment relative to both the support beam 26 and the conveyed screen 14 in the operation of the apparatus 10.

The sprayer assembly 44 includes an upper coupling 50 which is provided in fluid communication at its upper end with the hose 25, to receive a pressurized cleaning fluid flow from the water pump 22. The coupling 50 fluidically connected at its lowermost end with a cleaning head 52 by way of a rotary seal 54.

Figure 5:
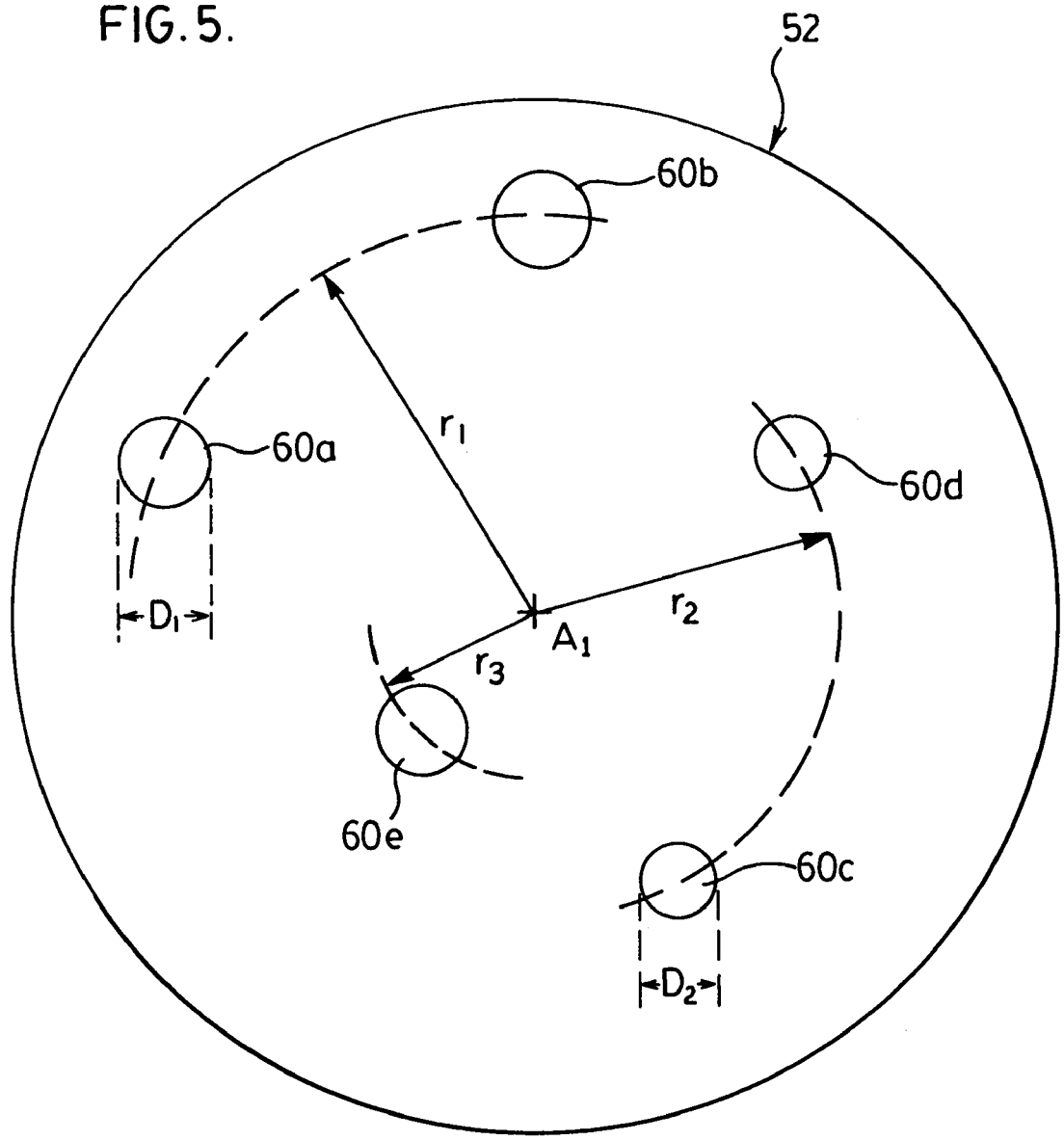
FIG. 5 illustrates a schematic end view of the cleaning head used in the cleaning head assembly of FIG. 2, illustrating the outlet nozzle configuration thereof.

The cleaning head 52 has formed therethrough five discrete fluid flow passages which extend from an upstream end, communicating fluidically with the coupling 50, to a respective lower outlet orifice 60, shown best in FIG. 5. FIG. 4 shows the upper coupling 50 and the cleaning head 52 as being generally aligned with a vertical axis $A_1$-$A_1$, which is generally normal to both the conveyor surface 30 (FIG. 2) and infeed and reverse directions 100,200 of the screen 14. Most preferably the sprayer assembly 44 is secured in the guide block 48 in an orientation selected to maintain the outlet orifices 60 of the cleaning head 52 a substantially constant distance of between about 5 and 10 cm, spaced above the portion of the screen 14 located vertically beneath the support beam 26

A head drive motor 64 is mounted to the guide block 48 adjacent the cleaning head 52. The motor 64 is operable to rotate the cleaning head 52 about the axis $A_1$-$A_1$ by way of a belt drive coupling 66. Most preferably, the motor 64 is operable to rotate the cleaning head 52 at a speed of between about 500 and 4,500 rpm, preferably 2,000 and 4,000 rpm, and most preferably about 3,000 rpm.

The outlet orifices 60 each open in alignment with the axis $A_1$-$A_1$. The orifices include a first orifice pair 60a,60b which are each spaced a furthest equal radial distance $r_1$ of about 3 to 5 cm from the axis $A_1$-$A_1$. The orifices 60a,60b are separated from each other along an arc of about 50° to 70° and formed as circular apertures with a preferred diameter of between about 4 and 8 mil, and most preferably about 6 mil.

A next second pair of apertures 60a,60b are spaced radially inwardly relative to the orifices 60a,60b so as to locate a distance $r_2$ of about 2 to 4 cm from the axis $A_1$-$A_1$. Each of the orifices 60c,60d are offset approximately 80° to 100° relative to each other. The orifice 60c,60d are formed as generally circular apertures having a diameter selected at between about 3 mil and 7 mil, and preferably about 5 mil.

Outlet orifice 60e is spaced radially inward most towards the axis $A_1$-$A_1$ a distance of $r_3$ of about 1 to 2 cm therefrom. As with the orifices pair 60a,60b, the orifice 60e is similarly formed as a circular aperture with a diameter selected at between about 4 mil and 8 mil, and preferably about 6 mil. Although not essential, most preferably the outlet orifice 60e is radially positioned interposed midway between outlet orifices 60a and 60c, with orifice 60c positioned approximately 110° to 130° offset about the axis from orifice 60a.

It is to be appreciated that the final diameter of each outlet orifice 60 is selected having regard to the flow capacity of the water pump 22, so as to provide a substantially linear fluid flow therefrom with an initial discharge pressure selected at between about 20,00° and 50,000 psi, and most preferably about 40,000 psi.

FIG. 2 shows best the apparatus 10 as further including an assembly drive 70 used in the simultaneous indexing of the cleaning head assemblies 20a,20b along the support beam 26 and horizontally relative to the screen 14. The assembly drive 70 includes an electric indexing motor 72 and a pulley cable 74. The cable 74 connects each of the cleaning head assemblies 20a,20b to each other and the indexing motor 72 by way of a series of pulleys 76 (FIG. 3). As shown best in FIG. 2, most preferably the indexing motor 72 is controlled by a central processing unit 90 to operate in conjunction with a pulley cable 74 to simultaneously move the cleaning assemblies 20a,20b in corresponding opposite directions along opposing halves of each respective side 38,40 of the support beam 26. It is to be appreciated, however, that in an alternate configuration, each of the assemblies 20a,20b could include dedicated associated drive motors, such as individual stepping motors, for independent movement relative to each other over part or all of the support beam 26.

In use of the cleaning apparatus 10 in an OSB manufacturing plant, initially each of the cleaning head assemblies 20a, 20b are moved to a initial start position, with the cleaning head assembly 20a moved adjacent to the support post 28b, and the cleaning head assembly 20b positioned past the midplane $M_P$-$M_P$ (FIG. 1) of the apparatus 10. Following the separation of the form OSB panel (not shown) from the screen 14, the screen is coupled to the conveyor assembly 18 by way of the chain lugs 34.

The screen 14 is then conveyed horizontally along the conveyor surface 32 in the infeed direction of arrow 100 (FIG. 2) into the cleaning apparatus 10, so as to move beneath the support beam 26 and cleaning assemblies 20a,20b. As the screen 14 moves with the conveyor 18, the water pump 22 and drive head motors 64 are simultaneously activated to supply high-pressurize water sprays from each of the nozzle orifices 60a-e of both cleaning heads 52 vertically downward onto the surface of the part of the screen 14 positioned thereunder.

The applicant has appreciated that as the cleaning heads 52 rotate, the smaller diameter orifices 60c,60d perform a cutting operation, breaking up and cutting through any residual wood fibers, waxes or resins remaining on the screen surface. The larger diameter apertures 60a,60b,60e thereafter provide a flushing operation to force the broken up particle debris through the openings in screen 14 for collection in the collecting pan 36 (FIG. 1).

In a preferred mode of operation, the central processing unit (CPU) 90 controls both the chain conveyor 18 and the assembly drive 70. The chain conveyor 18 is reciprocally moved the alternating move screen 14 in the direction of arrows 100,200 in a series of successive full length passes, beneath the cleaning head assemblies 20a,20b. At the end of each successive pass, the assembly drive 70 is actuated to move the cleaning assemblies 20a,20b horizontally, by a displaced distance equal to the spray width of the cleaning head 52, and which in a preferred construction is between about 5 and 15 cm. In this manner, the entire screen surface may be incrementally cleaned in successive passes by the application of high pressure clean fluid spray.

The applicant has further appreciated that as a result of the higher water pressures used and the comparatively narrow size of the outlet orifices 60, the spray apparatus 10 may advantageously be used to effect cleaning of the screen 14 with comparatively smaller water volumes. In a typical operation with two cleaning assemblies 20a,20b, the apparatus 10 is operable to provide a cleaning fluid spray with a volume rate of less than about 1 gallon per minute, and more typically at a fluid flow rate of approximately 0.86 gallons per minute.

Although the preferred embodiment of the invention illustrates the orifice 60 configuration of the cleaning head 52 as including five outlet orifices 60a-e, the invention is not so limited. It is to be appreciated that in an alternate construction, the cleaning head 52 could be provided with fewer or greater numbers of orifices 60 in alternate positions and sizes from those which are shown.

Similarly, although the preferred embodiment describes the apparatus 10 as including a pair of cleaning assemblies 20a,20b in a more economical construction, the invention could be provided with a single cleaning assembly 20 only. Similarly, three, four or more cleaning assemblies could also be used, depending upon the rate of cleaning operation which is to be achieved.

Although the detailed description describes the cleaning apparatus 10 as used to dislodge debris from caul screens, the invention is not so limited. It is to be appreciated that the apparatus is equally suitable for cleaning other porous or semi-porous substrates, including without restriction, perforated sheets, as well as other metal and synthetic mesh screens.

While the preferred embodiment describes the apparatus 10 as using surfactant-free water as a preferred cleaning fluid, it is to be appreciated that other cleaning fluids, including gases and surfactants with or without water could also be used.

While FIG. 1 illustrates the use of a horizontal beam 26 as supporting each of cleaning head assemblies 20a,20b in movement horizontally above a screen 14, in alternate configurations, one or more cleaning assemblies could be mounted for movement in horizontal and/or vertical directions on the end of a swing or robot arm for compound movement.

Although the detailed description describes and illustrates various preferred embodiments, the invention is not so limited. Many modifications and variations will now occur to persons skilled in the art. For a definition of the invention, reference may be had to the appended claims.

I claim:

1. A caul screen cleaning apparatus for cleaning debris from the surface of a porous caul screen, the apparatus comprising at least one cleaning head assembly having a cleaning head, and a pressurized fluid source for supplying cleaning fluid under pressure to said cleaning head, the cleaning head having an upstream end fluidically coupled to said pressurized fluid source and a plurality of outlet nozzles in fluid communication with the upstream end, the outlet nozzles each being operable to direct a cleaning fluid flow in an axial direction onto a surface of said caul screen, said fluid flow comprising at least one generally pressurized fluid stream having an emitted pressure of between about 10,000 and 50,000 psi, a head drive operable to selectively rotate said cleaning head about the axis, a support member for supporting said outlet nozzle in an operable position spaced from said sheet, and a conveyor for reciprocally moving at least one of said sheet and said support member relative to each other.

2. The apparatus of claim 1 wherein the cleaning head is mounted for rational movement about an axis extending generally normal to said surface.

3. The apparatus as claimed in claim 1 wherein the head drive is operable to rotate said head about said axis at a speed selected at between about 1,000 and 4,000 rpm.

4. The apparatus as claimed in claim 1 wherein said support comprises a longitudinally extending support beam spaced from said surface of said sheet, said apparatus comprising a plurality of cleaning head assemblies movable longitudinally relative to said support beam.

5. The apparatus as claimed in claim 4 wherein said pressurized fluid stream comprises a pressurized stream of surfactant-free water.

6. The apparatus as claimed in claim 5 wherein said pressurized water stream comprises a substantially linear stream of water at a supply pressure selected at between about 30,000 and 50,000 psi.

7. The cleaning apparatus of claim 1 wherein said operable position is selected at between about 5 and 15 cm from said sheet, each of said outlet nozzles being operable to emit said pressurized fluid stream as a generally linear pressurized water stream with an outflow pressure selected at between about 20,000 and 45,000 psi.

8. The cleaning apparatus of claim 7 wherein the cleaning head includes at least one pair of outlet nozzles having a first orifice diameter selected at between about 3 and 7 mil, and a second other pair of outlet nozzles having a second orifice diameter selected at between about 4 and 8 mil.

9. The cleaning apparatus of claim 8 wherein said caul screen comprises a metal caul screen, and said debris is selected from the group consisting of wood fibers, waxes and glues.

10. A caul screen cleaning apparatus for removing wood fibers and waxes from the surface of a caul screen, the caul screen comprising a generally planar mesh sheet having mesh openings with an average size selected at between about 0.1 and 0.6 mm, the apparatus comprising a pressurized fluid source, a sprayer assembly in fluid communication with the fluid source, the sprayer assembly including a cleaning head assembly having a cleaning head operable to emit a cleaning spray in a first direction generally perpendicular to the planar mesh sheet, support assembly for supporting said spray assembly comprising at least one generally horizontally extending elongate member, the sprayer assembly being slidably mounted on said elongate member, an assembly drive activatable to selectively position said sprayer assembly relative to said elongate member, a conveyor for reciprocally conveying at least part of said mesh sheet in a conveyance direction generally normal to a direction of elongation of said elongate member, said conveyor maintaining said caul screen in an orientation permitting substantially unhindered movement of said support assembly along said elongate member during cleaning operation, the assembly drive being activatable to advance said sprayer assembly in a transverse direction normal to said conveyance direction to move said cleaning head across said mesh sheet, wherein during operation of the sprayer assembly to emit said cleaning spray, said conveyor is operable to move said caul screen in said first direction to move at least part of said mesh sheet beneath said cleaning spray, said cleaning head being positioned less than about 15 cm from the part of the mesh sheet to be cleaned, and said cleaning spray comprises at least one generally linear water stream with an emitted pressure selected at between about 10,000 and 50,000 psi.

11. The cleaning apparatus as claimed in claim 10 wherein said cleaning head comprises a rotatable head including at least three outlet nozzles, each of said outlet nozzles being operable to emit a respective one of said linear water streams therefrom, at least one of said outlet nozzles having an orifice diameter of between about 3 and 8 mil, and head drive means operable to selectively drive said rotatable head in rotational movement at between about 500 and 15,000 rpm.

12. A caul screen spray cleaning apparatus for cleaning debris from the surface of a caul screen, the apparatus comprising a cleaning fluid source and at least one cleaning assembly having a cleaning head fluidically coupled to the cleaning fluid source,
a support member for movably supporting and maintaining said at least one cleaning assembly spaced a predetermined operable distance from said caul screen,
the cleaning head having a plurality of outlet nozzles each operable to emit a respective cleaning fluid stream therefrom onto a surface of said caul screen, and
a conveyor for selectively moving said screen relative to said support while said cleaning fluid streams are emitted from said nozzles, and wherein said cleaning head is spaced from the caul screen by an operable distance selected at between about 5 and 15 cm, and said nozzles are operable to emit said cleaning fluid stream as pressurized water streams with an outflow pressure selected at between about 20,000 and 45,000 psi.

13. The cleaning apparatus as claimed in claim 12 wherein said cleaning head is mounted for rotation about a head axis, and further including a head drive for selectively rotating said cleaning head.

14. The cleaning apparatus of claim 13 wherein said plurality of nozzles include a first pair of nozzles having a first orifice diameter spaced a first radial distance from said axis, and a second pair of nozzles having a second orifice diameter spaced a second diameter from the axis.

15. The cleaning apparatus of claim 14 wherein the first orifice diameter is selected at between about 3 and 7 mil, and the second orifice diameter is selected at between about 4 and 8 mil.

16. The cleaning apparatus of claim 15 wherein the head drive operable to rotate the head at a rate selected at between about 2,500 and 3,500 rpm.

17. The cleaning apparatus of claim 12 wherein the support comprises an elongated support beam extending horizontally over at least part of said caul screen, the apparatus further including an indexing drive for indexing the cleaning head in horizontal movement relative to said support beam.

18. The cleaning apparatus of claim 17 wherein said caul screen comprises a metal caul screen and said debris is selected from the group consisting of wood fibers, waxes and glues.

* * * * *